United States Patent [19]

Eichenauer

[11] Patent Number: 4,628,863
[45] Date of Patent: Dec. 16, 1986

[54] DISPOSABLE CAT LITTER BOX

[76] Inventor: Larry L. Eichenauer, P.O. Box 43, Crosby, Tex. 77532

[21] Appl. No.: 722,806

[22] Filed: Apr. 12, 1985

[51] Int. Cl.⁴ .............................................. A01K 29/00
[52] U.S. Cl. ........................................ 119/1; 229/140
[58] Field of Search ................ 119/1; 229/31 FS, 33, 229/34 R, 38, 39 R

[56] References Cited

U.S. PATENT DOCUMENTS

| | | | |
|---|---|---|---|
| Re. 30,424 | 11/1980 | Heldenbrand | 119/1 |
| 2,439,768 | 4/1948 | Ball | 229/38 |
| 2,741,223 | 4/1956 | Winborn, Jr. | 119/1 |
| 2,917,221 | 12/1959 | Risdon | 229/34 R |
| 3,154,052 | 10/1964 | Sweeney | 119/1 |
| 3,229,891 | 1/1966 | Edelman | 229/39 R |
| 3,348,756 | 10/1967 | Boysen | 229/37 R |
| 3,365,114 | 1/1968 | Macchi | 229/38 |
| 3,377,990 | 5/1966 | Mitchell | 119/1 |
| 3,581,975 | 6/1971 | Riccio | 119/1 X |
| 3,684,155 | 8/1972 | Smith | 119/1 X |
| 3,743,170 | 7/1973 | Riccio | 119/1 X |
| 3,886,901 | 6/1975 | Zeitter | 119/1 |
| 4,014,292 | 3/1977 | Coughlin | 119/1 |
| 4,047,499 | 9/1977 | Janecek | 119/1 |
| 4,250,580 | 2/1981 | Eichenauer | 5/93 R |
| 4,271,787 | 6/1981 | Wellman et al. | 119/1 |
| 4,305,544 | 12/1981 | Noonan | 119/1 X |
| 4,372,477 | 2/1983 | Wytko | 229/34 R X |
| 4,441,451 | 4/1984 | Neal | 119/1 |
| 4,501,226 | 2/1985 | Bienvenu et al. | 119/1 |

*Primary Examiner*—Robert P. Swiatek
*Attorney, Agent, or Firm*—Gunn, Lee & Jackson

[57] ABSTRACT

A disposable cat litter box comprising a single sheet of stiff paperboard which is folded and perforated for assembly into an open top, generally rectangular cat litter box is disclosed. The box is prepackaged with cat litter and may be assembled to form a cat litter box. The box preferably includes a horizontally extending bottom attached to upwardly extending side and end walls. The side and end walls having foldable portions which may be folded over and sealed to define a substantially rectangular closed box. For use, the upper portions of the side and end walls are unfolded and positioned substantially perpendicular to the bottom portion. End flaps on the side and end walls may be folded inwardly forming a rigid perimeter defining an open, generally rectangular box. After use, the side and end walls may be collapsed and folded over to enclose the cat litter for disposal.

16 Claims, 8 Drawing Figures

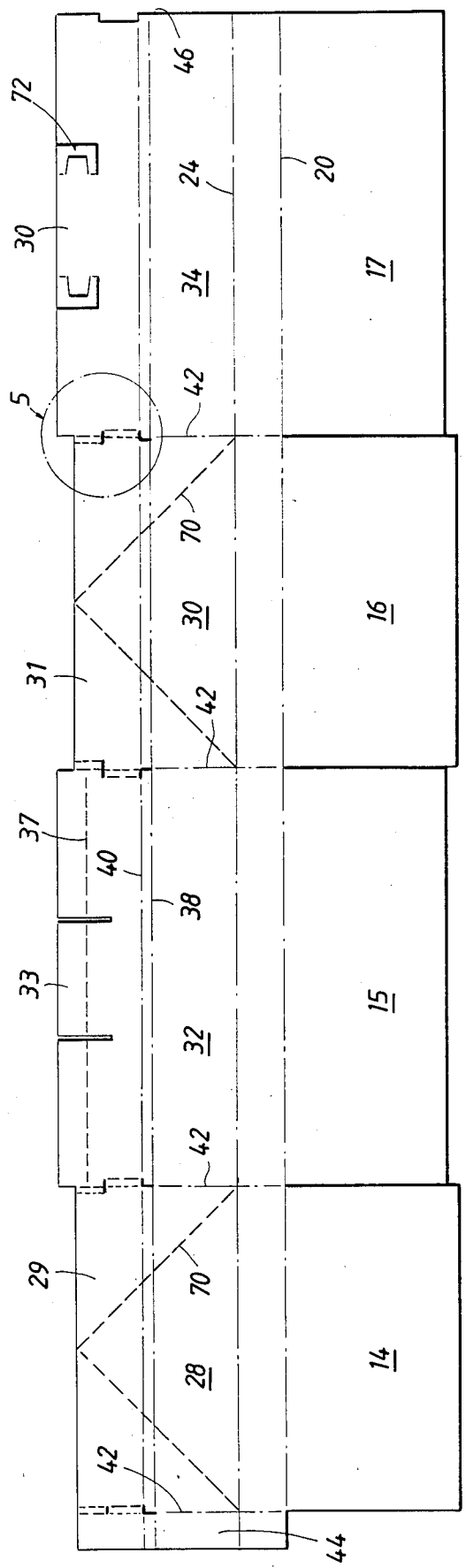
FIG. 4
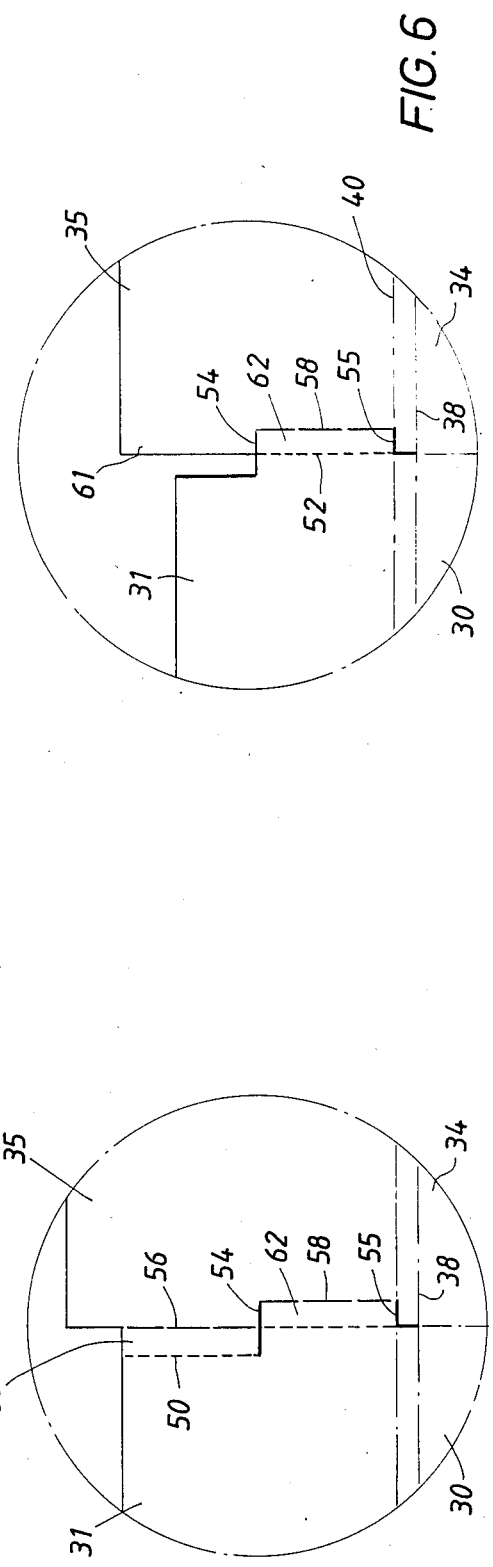
FIG. 6
FIG. 5

DISPOSABLE CAT LITTER BOX

BACKGROUND OF THE INVENTION

This invention relates to cat litter boxes, particularly, a disposable cat litter box which is prepackaged with cat litter.

It is conventional and well known in the prior art for households having cats to provide a cat litter box for the cat, particularly when the cat is a house pet residing primarily indoors. Consequently, many devices have been designed to retain cat litter. Typically, cat litter boxes are formed of a hard plastic material open at the top and typically rectangular in shape. Cat litter is separately packaged in a bag requiring that the cat litter be poured into the litter box. After usage, it is necessary to discard the cat litter and clean the litter box. This is a particularly messy and unpleasant duty which must be repeated regularly. Therefore, many attempts have been made to develop a superior and less time consuming system for disposal of cat litter.

U.S. Pat. No. 4,305,544 to Noonan exemplifies prior attempts to overcome the unpleasantness associated with clean up of cat litter boxes. Noonan describes a disposable cat litter box formed of paperboard. The box is substantially rectangular in shape open at the top and closed at the bottom. The box is provided with a horizontally oriented and inwardly extending border about the open end of the box to prevent the loss of litter during usage. The litter box of Noonan is disposable and specifically designed to receive cat litter but not to merchandise cat litter. Thus, use of the Noonan litter box still requires that cat litter be poured from a separate bag into the litter box. Cat litter is a granular material which is easily spilled if care is not taken when pouring it into the litter box. Also, sufficient cat litter must be poured into the litter box to provide adequate absorption during use; however, too much cat litter in the litter box may result in cat litter being kicked out of the box by the cat during use. It is, therefore, apparent that some care must be exercised when placing cat litter from the bag into the cat litter box insuring that an adequate amount, but not a surplus, of the cat litter is used. The present invention provides a disposable cat litter box prepackaged with cat litter for overcoming these prior art difficulties.

The cat litter box of the present disclosure provides many advantages over the prior art device for the manufacturer, retail stores and the customer. Prepackaging cat litter in a thin package provides many advantages to the manufacturer by reducing handling costs. The thin rectangular box-like package of the present disclosure stacks better than bags for transportation and reduces the risk of damage associated with bags which may be easily torn. The ability of the box of the present disclosure to be stacked enables accurate counting of the boxes in a shipping load. Also, the cat litter boxes of the present disclosure may be banded together in convenient size lots for more efficient loading for shipment, thus further reducing shipping costs.

The dual function of the cat litter box of the present disclosure provides similar advantages to retail stores. The folded or collapsed arrangement of the cat litter box is particularly suited for stacking, taking up less shelf space than bags of cat litter. Broken cat litter bags are eliminated. The dual function of the cat litter box of the present disclosure also eliminates the need to stock both bags of cat litter and cat litter boxes. The flat, thin rectangular package shape of the cat litter boxes of the invention permit stacking anywhere in the retail store which may be aesthetically displayed.

The advantages to the consumer are numerous. The prepackaged design of the present disclosure eliminates purchase of both a bag of cat litter and a cat litter box. The cat litter box of the present disclosure is prepackaged with a predetermined amount of cat litter so that each box may be used for approximately one week. The design of the cat litter box enables the customer to easily carry two or three boxes. When not in use, the boxes may be conveniently stored on a shelf in the garage or the like. This eliminates purchasing a 20 or 25 pound bag of cat litter, a portion of which is to be periodically poured into a cat litter box. The prepackaged design of the disclosed cat litter box insures that the proper amount of cat litter is used, thus eliminating measuring or waste of cat litter. Often times, a small amount of cat litter is left in a bag which is not enough for use in the litter box and is, therefore, discarded. The disclosed litter box eliminates waste of cat litter.

The litter box of the present disclosure is provided with a large open top area defined by the upstanding side walls forming the litter box. A relatively large opening is preferred by cats. The side panels or walls of the litter box extend above the level of cat litter in the box a sufficient distance to reduce the amount of cat litter which may be kicked over the sides of a cat.

The litter box of the disclosure may be conveniently closed and locked for disposal. Closing the litter box reduces the odor associated with litter boxes by sealing the litter box upon closure.

The litter box of the present disclosure is portable and reusable. This is very convenient for travel. The litter box may be opened and closed as required and moved from place to place until such time as the litter box is ready for disposal.

SUMMARY OF THE INVENTION

The present invention provides a disposable cat litter box formed of paperboard which is coated with a waterproof material. The cat litter box of the invention is prepackaged with a premeasured amount of cat litter and closed to form a sealed, substantially rectangular box which may be subsequently opened to form a cat litter box having upstanding side walls extending from a substantially horizontal bottom portion to form an open top cat litter box.

The cat litter box of the present disclosure assembles into two forms, one being a folded and compact form and the other being a fully deployed cat litter box. In the folded arrangement, the cat litter box is folded into a relatively thin package containing cat litter. In the deployed arrangement, the cat litter box unfolds to define a large, rectangular bottom with surrounding, upright walls on four sides. The side walls are reinforced lengthwise and along the top edge of the side walls by foldable portions of the side walls which may be folded inwardly and downwardly against the side walls for strengthening the side walls and thereby defining a stiff surrounding wall extending about the bottom of the cat litter box. The surrounding wall extends a sufficient distance above the level of the cat litter in the litter box to prevent the loss of cat litter during usage. The litter box may be used for a period of time, typically a week. After use, the cat litter box of the present disclosure can be collapsed to enclose the cat litter and fecal matter for convenient disposal. The litter box is provided with locking tabs to hold the refolded ends in position to again form a relatively thin package for disposal.

BRIEF DESCRIPTION OF THE DRAWINGS

So that the manner in which the above recited features, advantages and objects of the present invention are attained and can be understood in detail, a more particular desription of the invention briefly summarized above, may be had by reference to the embodiments thereof which are illustrated in the appended drawings.

It is to be noted, however, that the appended drawings illustrate only typical embodiments of the invention and are therefore not to be considered limiting of its scope, for the invention may admit to other equally effective embodiments.

FIG. 4 is a plan view of a blank sheet of paper board scored and perforated to assist in assembly of the cat litter box of the invention;

FIG. 5 is an enlarged view showing in detail the score lines and perforations joining of each of the side walls forming the cat litter box of the invention;

FIG. 6 is an enlarged view showing in detail an alternate embodiment of the connection between each side wall of the cat litter box;

DETAILED DESCRIPTION OF THE PREFERRED EMBODIMENT

Figure 1:
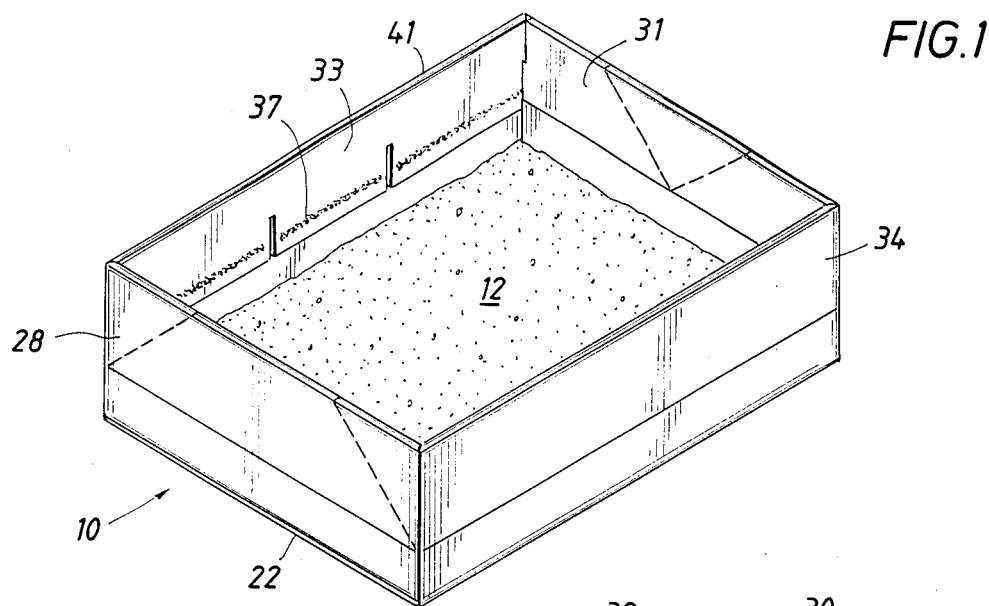
FIG. 1 is a perspective view of the cat litter box of the present invention deployed for use.
Figure 2:
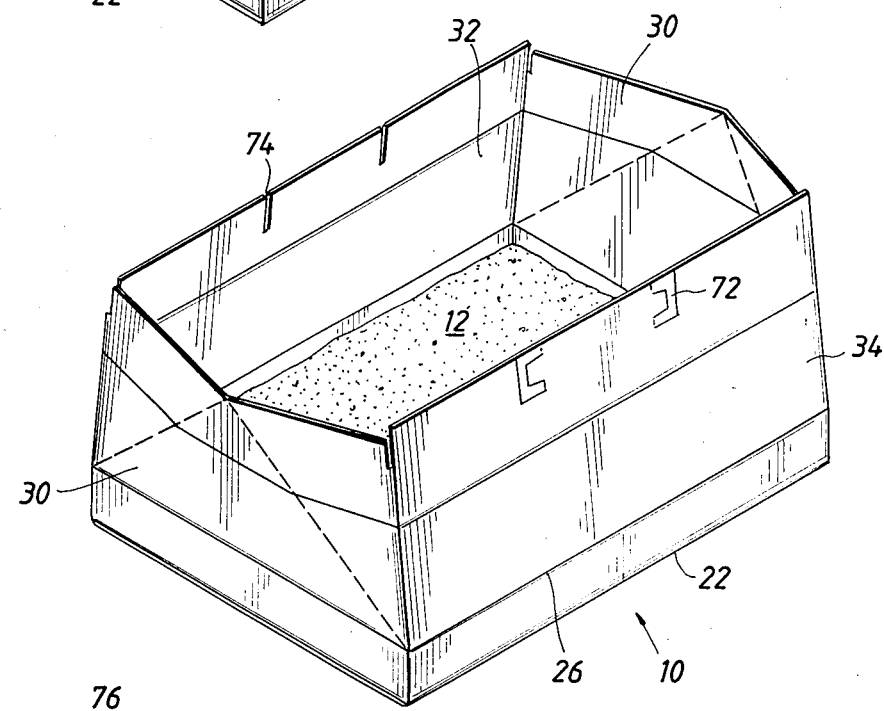
FIG. 2 is a perspective view of the cat litter box of the present invention in partial deployment.
Figure 3:
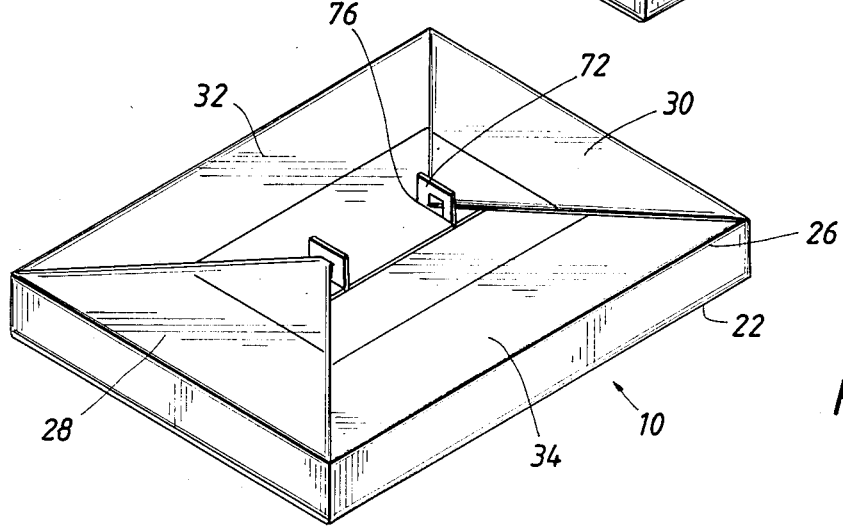
FIG. 3 is a perspective view of the cat litter box of the present invention in the fully closed and packaged position.

Attention is first directed to FIGS. 1-3 of the drawings wherein the disposable cat litter box of the present invention is generally identified by the reference numeral 10. The cat litter box 10 is prepackaged with a predetermined amount of cat litter 12. The cat litter box 10 is preferably usable for holding cat litter therein for use by cats or other domestic house pets, for example, rabbits or small dogs. The litter box 10 includes a bottom portion formed by bottom members 14, 15, 16 and 17, best shown in FIG. 4. Referring now specifically to FIG. 4, the blank 18 of material forming the litter box 10 is shown. The blank 18 is cut, perforated, scored and otherwise shaped into the litter box 10. The bottom members 14-17 are substantially rectangular in shape and comprise the bottom of the litter box 10. The bottom members 14-17 fold along the score line 20 which is a machine formed crease extending across the paperboard blank 18. The score line 20 defines the lower edge 22 of the cat litter box 10 as shown in FIGS. 1-3. A second score line 24 is spaced from the score line 20 and parallel thereto extending the full length of the paper board blank 18. The score line 24 permits folding of the side walls of the litter box 10 to enclose the cat litter 12 and defines the circumferential edge 26 of the litter box 10 shown in FIGS. 2 and 3. The space between the score lines 20 and 24 defines the height of the litter box 10 in the closed or folded position.

The sides of the litter box 10 are defined by walls which may be folded to form the closed container shown in FIG. 3 or erected to form the opened litter box shown in FIG. 1. The surrounding wall is formed by end wall members 28, 30 and side wall members 32, 34. Each wall member includes a flap which may be folded inwardly to reinforce and provide stiffness for the wall members in the erected position shown in FIG. 1. End wall members 28 and 30 therefore include end flaps 29 and 31 extending therefrom, respectively. Likewise, side wall members 32 and 34 include end flaps 33 and 35 extending therefrom, respectively. A pair of score lines 38 and 40 extending the length of the blank 18 form a crease permitting the end flaps 29, 31, 33 and 35 to be double folded defining the uppermost peripheral edge 41 shown in FIG. 1.

The cat litter box 10 is fabricated of paperboard material which is coated with a sealant to make it waterproof. Thus, moisture in the litter box 10 will not leak through the paperboard material. When assembled, the bottom members 14-17 are overlapped to form the bottom of the litter box 10. The overlapping surfaces of the bottom members 14-17 are provided with glue or other type of adhesive material for joining the bottom members together to form a leak-proof bottom. Vertical score lines 42 formed in the blank 18 permit the wall members to be folded towards each other to form the box-like structure of the litter box 10. The flap 44 projecting from the wall member 28 is adhesively joined along the vertical edge 46 of the wall member 34 and end flap 35 shown in FIG. 4; thus forming substantially the profile of the partially opened litter box 10 shown in FIG. 2. In the prepackaged form of the cat litter box 10 which may be found at a retail store, the side walls and end walls of the litter box 10 are folded over and glued, thereby sealing the litter box 10 completely enclosing the cat litter 12. Preferably, glue is applied on the surface of the slotted end flap 33 in the form of a bead 37 illustrated by a dark line in FIG. 4. A glue strip 39 is also applied to the folded end flaps 29 and 31 in the manner illustrated in FIG. 8. When the walls of the litter box 10 are folded over in the manner illustrated in FIG. 8, a lengthwise seal is formed joining the overlapping end flaps together.

To open the litter box 10 for use, the folded end flaps 29 and 31 are pulled apart from the end flaps 33 and 35 along the glue strip 39. Thereafter, the end flaps 33 and 35 are separated along the glue bead 37 permitting the side and end walls of the litter box 10 to be erected as shown in FIG. 2. When fully erected, the end flaps 29, 31, 33 and 35 are folded 180° to provide added stiffness to the wall members 28, 30, 32 and 34 as best shown in FIG. 1. The wall members 28, 30, 32 and 34 extend to the bottom of the litter box 10 and consequently a specified height above the level of the cat litter 12.

Attention is next directed to FIG. 5 which is an enlarged view showing the perforated connection joining the end flaps 29, 31, 33 and 35. In the prepackaged assembly, the flaps are joined along the perforations so that when the end flaps are folded over to close the cat litter box 10, the cat litter 12 does not leak out. However, upon deployment of the side walls to form the cat litter box 10 for use by a cat, the end flaps must be separated so that they may be folded inwardly against the side walls as shown in FIG. 1. the end flaps are separated along the small perforations 50 and 52 shown in FIG. 5. The perforations 50 and 52 are offset from each other and separated by a straight cut 54. A pair of large perforations 56 and 58 are spaced from and are parallel to the small perforations 50 and 52, respectively. Each pair of large and small perforations defines a tab 60 and 62 therebetween. Separation between the end flaps is along the small perforations 50 and 52. In FIG. 5, the connection between end flaps 31 and 35 is shown in detail. Each of the end flap corner connections is the same. The following discussion is, therefore, equally applicable for each corner connection. The large perforations 56 and 58 permit the tabs 60 and 62 to be folded inwardly and out of the way as the flaps 31 and 35 are folded toward the end walls 30 and 34, respectively. Space is limited at the corner connection, thus folding the tabs 60 and 62 along the large perforations 56 and 58 permits the tabs 60 and 62 to be out of the way as the flaps 33 and 35 are folded into position, thus preventing binding at the corner junction. Right angle cuts 55 permit the flap 62 to be folded against the end flap 35 and also permit the end flaps 31 and 35 to be folded over along the double fold defined by the score lines 38 and 40.

In FIG. 6, an alternate embodiment of the corner connection is disclosed. The embodiment of FIG. 6 is substantially identical to the embodiment of FIG. 5; however, in FIG. 6, the flap 60 has been eliminated. Thus, a gap 64 is provided between the end flaps 31 and 35. The gap 64 terminates at the straight cut 54.

Assembly of the cat litter box 10 occurs in the following manner. First of all, the flap 44 is folded along score line 42 so that it is substantially perpendicular to the wall member 28. Each of the wall members is folded along the score lines 42 so that the flap 44 is positioned to be adhesively joined to the wall member 34 along the edge 46, thus forming a substantially rectangular shaped enclosure. The bottom members 14–17 which have been coated with adhesive are folded along the score line 20 in an overlapping fashion to form the bottom of the litter box 10. The bottom members 14 and 16 are folded inwardly first and contact adhesive is applied on the back surface thereof. Likewise, contact adhesive is applied to the bottom members 15 and 17 on the facing surface shown in FIG. 4 for connection to the bottom surface of the bottom members 14 and 16. The adhesive may be applied across the surface of the bottom members or along the edges thereof as desired. The interior of the litter box 10 is coated with a waterproof sealant material. A premeasured amount of cat litter 12 is poured into the cat litter box 10. A sufficient amount of cat litter 12 is used so that the cat litter box may be used for approximately one week under normal usage conditions and then discarded. Once the cat litter 12 has been poured into the litter box 10 to a sufficient level, the litter box 10 is ready to be closed for shipment.

At this point, the end wall members 28 and 30 are simultaneously folded outwardly about the score line 24 and inwardly along the angular perforations 70. Simultaneously therewith, the side wall members 32 and 34 are folded inwardly about the score line 24 to cover the cat litter 12. The end wall members 28 and 30 are then folded over 180° onto the end wall members 32 and 34 and are glued thereto at 37 and 39, thereby closing the litter box 10 to form a relatively thin, substantially rectangular package for shipment.

The cat litter box 10 is thus packaged in the foregoing manner for distribution to the consumer. To assemble the cat litter box 10 for use by a cat or other household pet, the folded end wall members 28 and 30 which are glued to the side wall members 32 and 34 are separated from the wall members 28 and 30 in the manner described above so that the wall members may be erected as shown in FIG. 2. The perforations 50 and 52 are then torn, thereby separating the end flaps 29, 31, 33 and 35. At this juncture, the end flaps 29 and 31 are folded inwardly 180° at the double fold defined between the score lines 38 and 40. The side flaps 33 and 35 are then folded inwardly 180° to complete the assembly of the cat litter box 10 as shown in FIG. 1. As each end flap is folded against the end or side wall members, the tab 60 (FIG. 5) or tab 61 (FIG. 6) locks or extends into the slot or gap formed at the corners of the litter box 10 where the slotted edges of the end flaps come together. The tabs 60 and 61 thus perform a locking function to hold the end flaps against its side wall members.

For disposal purposes, the cat litter box is disassembled and closed in the following manner. The end flaps 33 and 35, followed by end flaps 29 and 31, are initially unfolded and deployed upwardly to the position shown in FIG. 2. Then, the side wall members 32 and 34 are folded inward above the litter 12 while the end wall members are folded outward. The lock tabs 72 on the flap 35 are popped up so that they extend through the slots 74 incorporated in the flap 33 upon closure thereof over the cat litter 12 as shown in FIG. 3. The end flaps 29 and 31 are folded along the perforations 70 and folded 90° to the closed position shown in FIG. 3. The pointed ends 76 of the folded end flaps 29 and 31 extend through the locking tabs 72 to lock the end flaps in position as shown in FIG. 3 for convenient disposal of the cat litter box 10.

Figure 7:
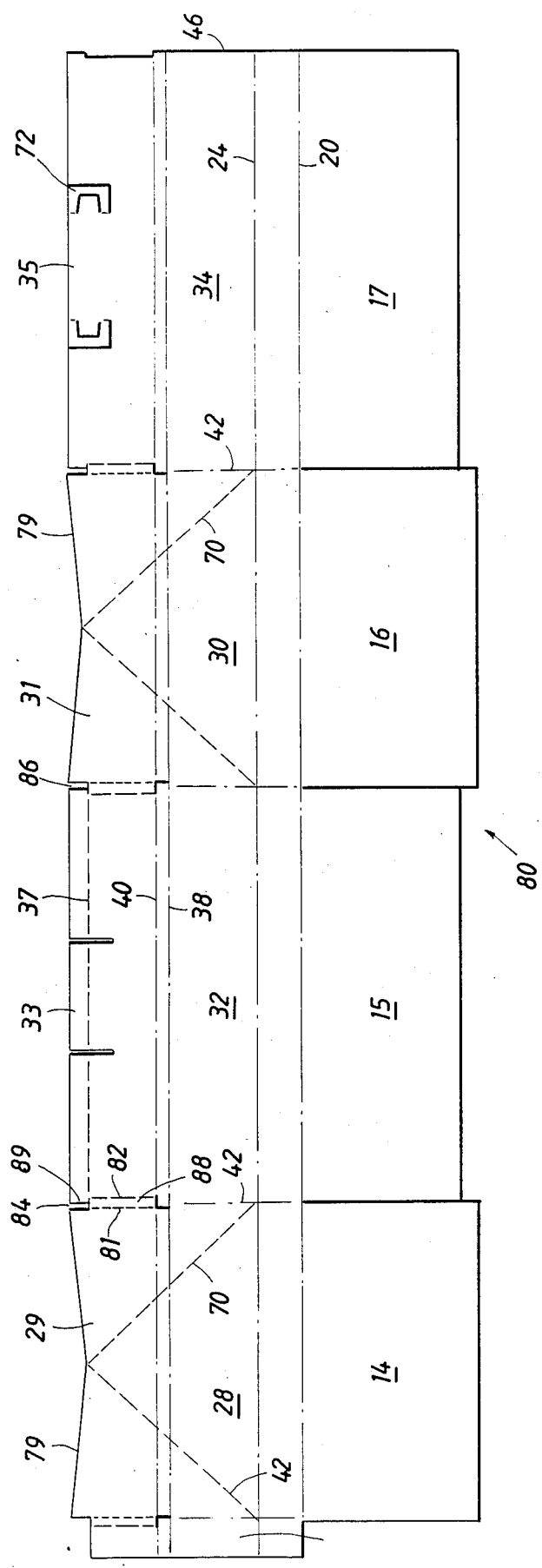
FIG. 7 is a plan view of a blank sheet of paper board showing an alternate embodiment of the cat litter box of the invention.
Figure 8:
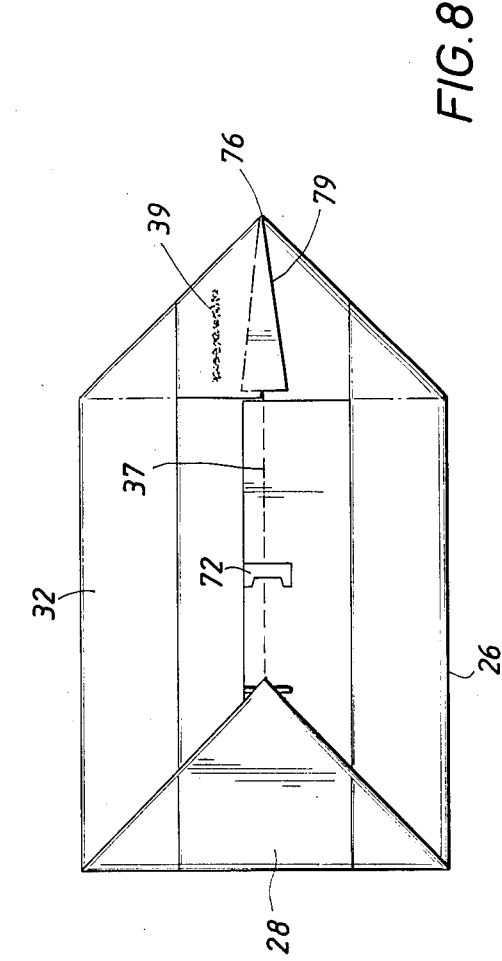
FIG. 8 is a top view of the cat litter box of the invention partially closed.

Referring now to FIGS. 7 and 8, an alternate embodiment of the litter box 10 is shown. The alternate embodiment of FIGS. 7 and 8 is substantially identical to the previously described embodiment and therefore like reference numerals have been used to identify the same or similar parts. The embodiment of FIGS. 7 and 8 differs in two important details. First, the longitudinal edge 79 of the end flaps 29 and 31 is not straight but instead tapers slightly toward the center of the flaps, terminating at the apex of the perforations 70. The taper is very slight, forming a very wide V in profile. The other difference of note is the elimination of offset perforations at the joinder of each end flap. As best shown in FIG. 7, the blank 80 of the alternate embodiment is provided with a single small perforation 81 adjacent to a parallel long perforation 82 spaced therefrom. The end flaps are notched to form a small gap 84 terminating at the straight cut 54 which separates the end flaps. The cat litter box of FIG. 7 is deployed to form a litter box in substantially the same manner as previously described. The end flaps are separated along the small perforations 81 to be folded inwardly to the position shown in FIG. 1. The tabs 88 fold at the large perforation 82 approximately 90° allowing tab 89 to look into the slot 84. Closure of the cat litter box 10 is likewise substantially the same with the end flaps first being unfolded and the lock tabs 72 popped up for extension through the slots 74. The end flaps 29 and 30, however, when folded along perforations 70 include portions which overlap as shown in FIG. 8. The overlap is such that the edges 86 and the straight cut 54 defining the slot 84 come together to close the slot so that leakage of cat litter is not permitted past the point of overlap. The end flaps are then folded over and locked in the locking tabs 72 as previously described and the cat litter box 10 may be discarded.

The dimensions of the cat litter box of the invention can be varied in a relative manner. For instance, the bottom of the cat litter box is typically in the range of 16–24 inches in length and has a width between 12–16 inches. These dimensions, however, are only typical, certainly not limiting. The erected side walls should extend approximately six inches in height to provide an adequate barrier to prevent cat litter from being easily kicked out by a cat. Again, these dimensions are typical and can be varied over a wide range. Preferably, the cat litter box of the invention is made of corrugated paperboard stock. Needless to say, various weights and types of sheet material can be used. Single wall corrugated paperboard material is ordinarily the most desirable material.

While the foregoing is directed to the preferred embodiment of the present invention, other and further embodiments of the invention may be devised without departing from the basic scope thereof, and the scope thereof is determined by the claims which follow.

What is claimed is:

1. A disposable cat litter box, comprising:
   (a) a sheet of corrugated paperboard material, the sheet folding into a generally rectangular, open topped box;
   (b) said sheet including bottom members adapted for folding along a first transverse fold line extending across said sheet to form a bottom portion of said litter box;
   (c) wall members extending from said first fold line and being adapted to be erected on folding perpendicular to said bottom portion;
   (d) said wall members folding along vertically extending score lines formed in said sheet and connecting to form a generally rectangular open topped box;
   (e) said wall members further including end flaps adapted for folding along a double fold line extending across said wall members, said double fold line enabling said end flaps to be folded and positioned in planar contact with said wall member; and
   (f) wherein said end flaps are extensions of said wall members joined along parallel short and long perforations formed in said sheet, said perforations being extensions of said vertical score lines.

2. The apparatus of claim 1 wherein said wall members include a pair of oppositely facing end walls and a pair of oppositely facing side walls attached to said bottom members, said end walls and said side walls being joined along said vertically extending score lines.

3. The apparatus of claim 2 wherein said perforation means comprises at least two sets of short perforations and long perforations spaced from and parallel to each other, said sets of perforations being separated by a straight cut formed in said sheet.

4. The apparatus of claim 2 wherein said end walls fold along a second, transverse fold line extending across said sheet, said end walls including a pair of angled perforations extending from corners defined by the intersection of said vertical score lines and said second fold line, said angled perforations defining end flap portions which are foldable along said angle perforations to form an inverted V-shaped end wall.

5. The apparatus of claim 4 wherein one of said pair of oppositely facing side walls includes a pair of lock tabs thereon, said lock tabs being received in slot means formed in the other of said side walls upon closing said side walls, said lock tabs being adapted to lock said V-shaped end walls to a closed position.

6. The apparatus of claim 1 wherein said box includes a layer of cat litter therein and said wall members are adapted to fold and enclose the cat litter upon folding of said wall members to seal the cat litter within said box, and said wall members defining a relatively thin, substantially rectangular package upon closure.

7. A disposable cat litter box, comprising:
   (a) a sheet of paperboard material;
   (b) said sheet including bottom members adapted for folding along a first transverse fold line extending across said sheet to form a bottom portion of said litter box upon which cat litter may be placed;
   (c) end walls secured to and adapted to extend vertically from said bottom;
   (d) side walls secured to and adapted to extend vertically from said bottom;
   (e) said end walls and said side walls folding along vertically extending score lines formed in said sheet and connecting to form a cat litter box having an open top;
   (f) end flaps secured to said end walls and said side walls at a double fold line extending horizontally across said sheet, said end flaps being joined along parallel short and long perforations formed in said sheet, said perforations being extensions of said vertical score lines;
   (g) wherein said end walls and said side walls fold along a second transverse fold line extending across said sheet enabling said end walls and said side walls to be folded inwardly for closing the litter box;
   (h) means for sealing said inwardly folded side walls and said inwardly folded end walls for forming a sealed cat litter box enclosing the cat litter;
   (i) means for unsealing said inwardly folded side walls and said inwardly folded end walls to form the cat litter box; and
   (j) means for resealing said end walls and said side walls for disposal of the litter box.

8. The apparatus of claim 7 wherein said paperboard material is coated with a moisture resistant sealant.

9. The apparatus of claim 7 wherein said sealing means comprise an adhesive applied to said inwardly folded side walls and said inwardly folded end walls.

10. The apparatus of claim 7 wherein said end flaps are connected along said short and long perforations upon initially sealing said inwardly folded side walls and said inwardly folded end walls.

11. The apparatus of claim 10 wherein upon unsealing said inwardly folded side walls and said inwardly folded end walls, said end flaps are separated along said perforations and folded inwardly to contact said side walls and said end walls erected to form the open cat litter box.

12. The apparatus of claim 11 including an outwardly extending tab formed along the separated edges of said end flaps on separation of said end flaps along said perforations, said tab being adapted to lock said end flaps upon inwardly folding said end flaps to contact said end walls.

13. The apparatus of claim 7 wherein said end walls include a pair of angled perforations extending from corners defined by the intersection of said vertical score lines and said second fold line, said angled perforations defining end flap portions which are foldable along said angled perforations to form an inverted V-shaped end wall.

14. The apparatus of claim 13 wherein one of said pair of oppositely facing side walls includes a pair of lock tabs thereon, said lock tabs being received in slot means formed in the other of said side walls upon closing said side walls, said lock tabs being adapted to lock said V-shaped end walls to a closed position.

15. The apparatus of claim 14 wherein said end walls are rotated outwardly enabling said side walls to fold inwardly along said second transverse fold line and said end flap portion of said end walls to fold inwardly along said angled perforations, said outwardly rotated end walls subsequently being folded inwardly overlying aid inwardly folded side walls for locking engagement with said lock tabs.

16. The apparatus of claim 13 wherein said end flaps include a longitudinal edge tapering toward the center of said end flaps and terminating at the intersection of said angled perforations formed in said end flaps.

* * * * *